United States Patent
Stefansky et al.

(10) Patent No.: US 6,222,706 B1
(45) Date of Patent: Apr. 24, 2001

(54) FLEXURE MICROACTUATOR

(75) Inventors: Frederick M. Stefansky, Longmont; Kenneth J. Altshuler, Boulder; Wallis A. Dague, Louisville; Rishi Kant, Boulder, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 6 days.

(21) Appl. No.: 09/068,670
(22) PCT Filed: Jan. 7, 1998
(86) PCT No.: PCT/US98/00464
  § 371 Date: Jan. 7, 1998
  § 102(e) Date: Jan. 7, 1998
(87) PCT Pub. No.: WO98/44488
  PCT Pub. Date: Oct. 8, 1998

Related U.S. Application Data
(60) Provisional application No. 60/047,373, filed on Jun. 2, 1997, and provisional application No. 60/042,839, filed on Mar. 31, 1997.

(51) Int. Cl.⁷ .......................................................... G11B 5/56
(52) U.S. Cl. ............................................................. 360/294.5
(58) Field of Search ................................... 360/104–106, 360/294.5, 294.6, 294.3

(56) References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |

(List continued on next page.)

FOREIGN PATENT DOCUMENTS

| | | |
|---|---|---|
| 0 412 221 B1 | 11/1989 | (EP) . |
| 63-122069 | 5/1988 | (JP) . |
| 2-263369 | 4/1989 | (JP) . |
| 4-134681 | 5/1992 | (JP) . |
| 4-368676 | 12/1992 | (JP) . |
| 5-094682 | 4/1993 | (JP) . |
| 6-020412 | 1/1994 | (JP) . |
| 7-085621 | 3/1995 | (JP) . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in² Density Magnetic Recording" by Koganezawa et al, *IEEE Transactions on Magnetics*, vol. 32, No. 5, Sep. 1996.

"Transverse Mode Electrostatic Microactuator for MEMS––Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

(List continued on next page.)

Primary Examiner—Allen T. Cao
(74) *Attorney, Agent, or Firm*—Kinney & Lange, P.A.

(57) ABSTRACT

A mechanism is provided to position a transducing bead with respect to a selected radial track of a rotatable recording disc in a disc drive including an actuator arm and a suspension load beam connected to the actuator arm. A plate is hingedly attached to the load beam, and a flexure is attached to the plate. A slider supporting the transducing head is attached to the flexure. A microactuator is attached to the plate and is operable in response to electrical control signals to move the plate relative to the load beam in the general plane of the load beam to selectively position the transducing head proximate to the selected radial track on the rotatable recording disc.

9 Claims, 14 Drawing Sheets

U.S. PATENT DOCUMENTS

| | | |
|---|---|---|
| 4,374,402 | 2/1983 | Blessom et al. .................. 360/104 |
| 4,605,977 | 8/1986 | Matthews ........................ 360/103 |
| 4,620,251 | 10/1986 | Gitzendanner ................... 360/103 |
| 4,651,242 | 3/1987 | Hirano et al. .................... 360/103 |
| 4,724,500 | 2/1988 | Dalziel ............................ 360/103 |
| 4,764,829 | 8/1988 | Makino ........................... 360/106 |
| 4,853,810 | 8/1989 | Pohl et al. ....................... 360/103 |
| 4,914,725 | 4/1990 | Belser et al. .................... 318/560 |
| 5,021,906 | 6/1991 | Chang et al. .................... 360/103 |
| 5,034,828 | 7/1991 | Ananth et al. ..................... 360/75 |
| 5,055,969 | 10/1991 | Putnam ........................... 361/398 |
| 5,065,268 | 11/1991 | Hagen ............................. 360/104 |
| 5,079,659 | 1/1992 | Hagen ............................. 360/104 |
| 5,105,408 | 4/1992 | Lee et al. ...................... 369/44.15 |
| 5,177,652 | 1/1993 | Yamaguchi et al. ........... 360/78.05 |
| 5,189,578 | 2/1993 | Mori et al. ...................... 360/106 |
| 5,255,016 | 10/1993 | Usui et al. ....................... 346/140 |
| 5,276,573 | 1/1994 | Harada et al. ................... 360/103 |
| 5,303,105 | 4/1994 | Jorgenson ....................... 360/106 |
| 5,333,085 | 7/1994 | Prentice et al. ................. 360/104 |
| 5,521,778 | 5/1996 | Boutaghou ...................... 360/106 |
| 5,552,809 | 9/1996 | Hosono et al. .................... 347/10 |
| 5,570,261 | 10/1996 | Frater et al. .................... 360/104 |
| 5,623,461 | 4/1997 | Sohmuta .......................... 369/32 |
| 5,650,894 | 7/1997 | Ikeda .............................. 360/104 |
| 5,657,188 | 8/1997 | Jurgenson et al. .............. 360/106 |
| 5,734,526 | 3/1998 | Symons ........................... 360/104 |
| 5,867,347 | 2/1999 | Knight et al. ................... 360/104 |
| 5,898,544 | 4/1999 | Krinke et al. . | |
| 5,936,805 | 8/1999 | Imaino . | |
| 6,069,771 | 5/2000 | Boutaghou et al. . | |

OTHER PUBLICATIONS

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N.

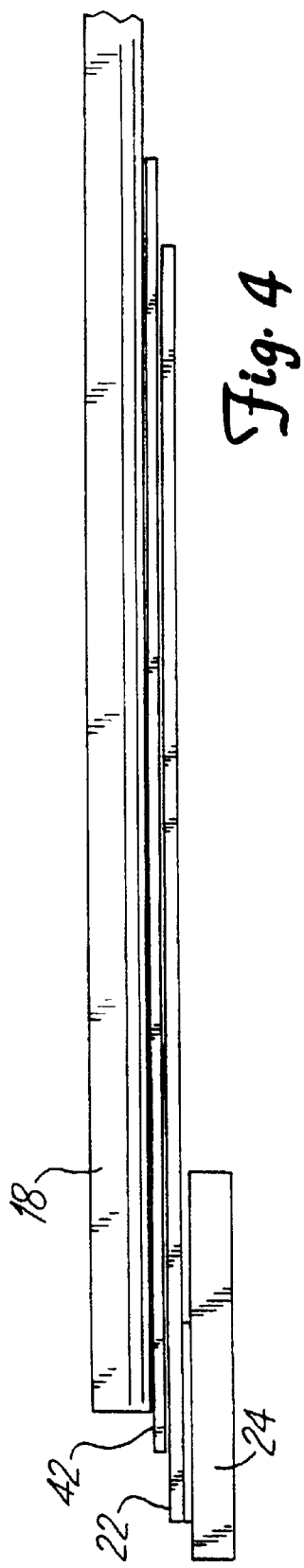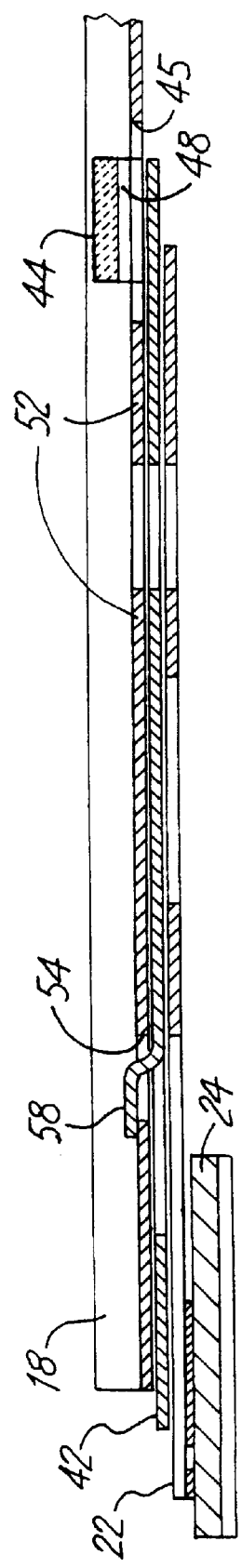

FLEXURE MICROACTUATOR

CROSS-REFERENCE TO RELATED APPLICATION

This application claims priority from Provisional Application Ser. No. 60/042,839 filed Mar. 31, 1997 for "Micro Actuator" by Frederick M. Stefansky, Longmont, Colo.; Kenneth J. Altshuler, Boulder, Colo.; Wallis A. Dague, Louisville, Colo. and Provisional Application Ser. No. 60/047,373 filed Jun. 2, 1997 for "Micro-Machine" by Frederick M. Stefansky and Wallis A. Dague.

BACKGROUND OF THE INVENTION

The present invention relates to a flexure microactuator, and more particularly to a high resolution head positioning mechanism having a piezoelectric element for moving a flexure carrying a slider to selectively move the head on the slider radially with respect to a rotatable disc.

The density, or radial spacing, between concentric data tracks on magnetic discs continues to increase, requiring greater precision in head positioning. Conventionally, head positioning is accomplished by operating an actuator arm with a large-scale actuator motor, such as a voice coil motor, to position a head on a flexure at the end of the actuator arm. The large-scale motor lacks sufficient resolution to effectively accommodate high track-density discs. Thus, a high resolution head positioning mechanism is necessary to accomplish the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. However, these designs all have shortcomings that limit the effectiveness of the microactuator. For example, where the microactuator was implemented directly on the slider, the complexity of slider design was increased and noise generated by the microactuator and by signal paths to it was induced into the head. New fabrication techniques had to be developed to integrate the slider and microactuator into a single structure. Where the microactuator was to be formed by thin-film wafer techniques onto the flexure, the entire flexure assembly had to be redesigned because the microactuator required a silicon substrate support and conventional gimbaling flexures were not constructed of silicon. Where the microactuator was implemented at the head mounting block (where the actuator arm connects to the head suspension load beam), high forces were required from the microactuator to move the mass associated with the head suspension at a speed (frequency) large enough to accommodate rapid track access. If the force was not great enough, the microactuator operated with lower natural frequency than was desirable, and track settling time was sacrificed. Therefore, the prior designs did not present ideal microactuator solutions.

There is a need in the art for a simple microactuator design to provide efficient high resolution head positioning in a dual-stage actuation system, that can be implemented by readily available manufacturing processes.

BRIEF SUMMARY OF THE INVENTION

The present invention is a mechanism for positioning a transducing head with respect to a selected radial track of a rotatable recording disc in a disc drive. The disc drive includes an actuator arm and a suspension load beam connected to the actuator arm. A plate is hingedly attached to the suspension load beam. A flexure is attached to the plate, and a slider supporting the transducing head is attached to the flexure. A microactuator is attached to the plate, and is operable in response to electrical control signals to move the plate relative to the load beam in the general plane of the load beam to selectively radially position the transducing head proximate to the selected track on the rotatable recording disc. In one form of the invention, the hinged attachment between the load beam and the plate is formed by a hinged portion of the load beam, distortable in response to operation of the microactuator to move the plate.

BRIEF DESCRIPTION OF THE DRAWINGS

FIG. 4 is a side view of the microactuator assembly shown in FIG. 2.

FIG. 5 is a section view of the microactuator assembly taken at line 5—5 in FIG. 3.

DETAILED DESCRIPTION OF THE PREFERRED EMBODIMENTS

Figure 1:
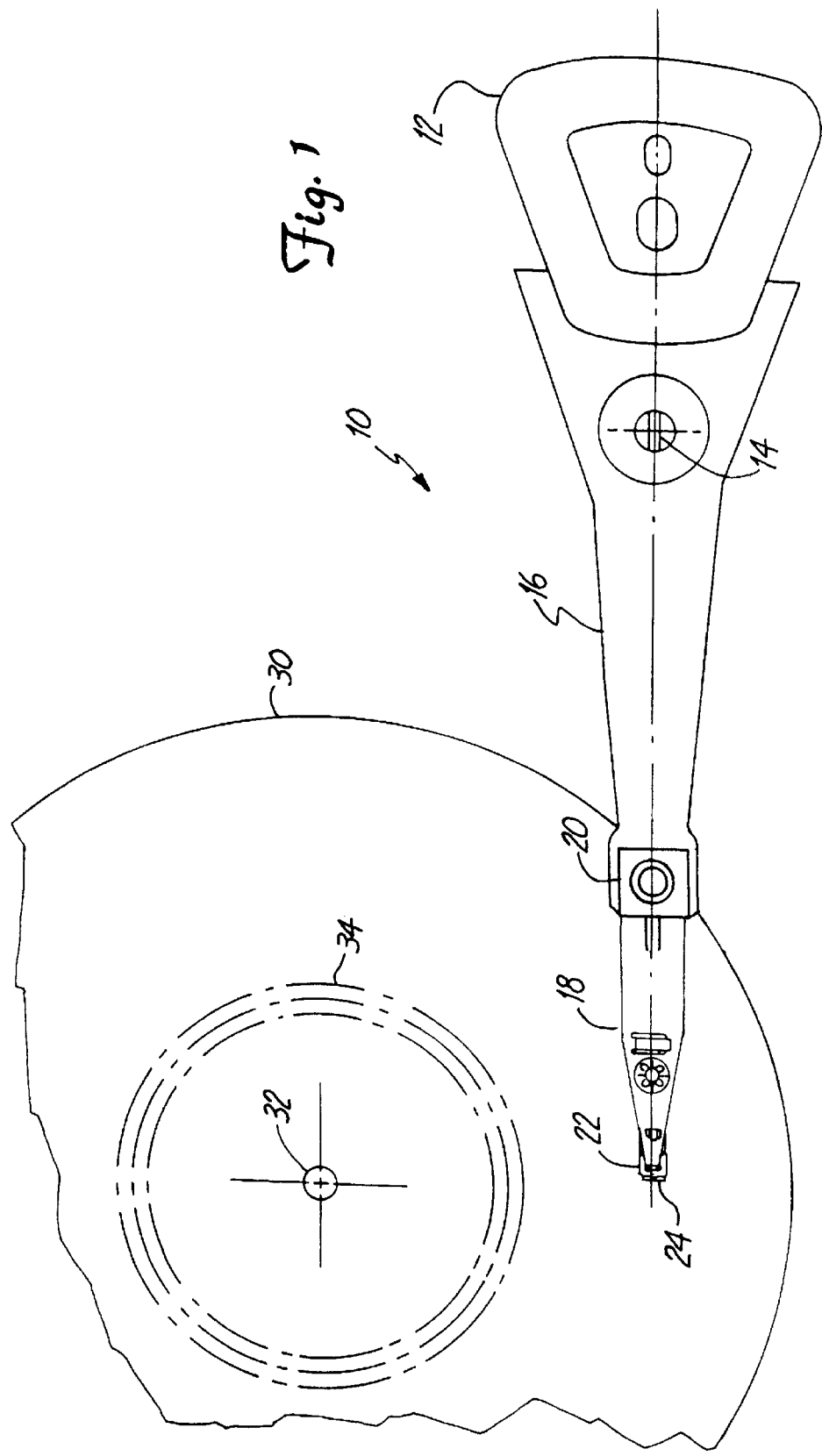
FIG. 1 is a top view of a disc drive actuation system for positioning a slider over tracks of a disc.
Figure 2:
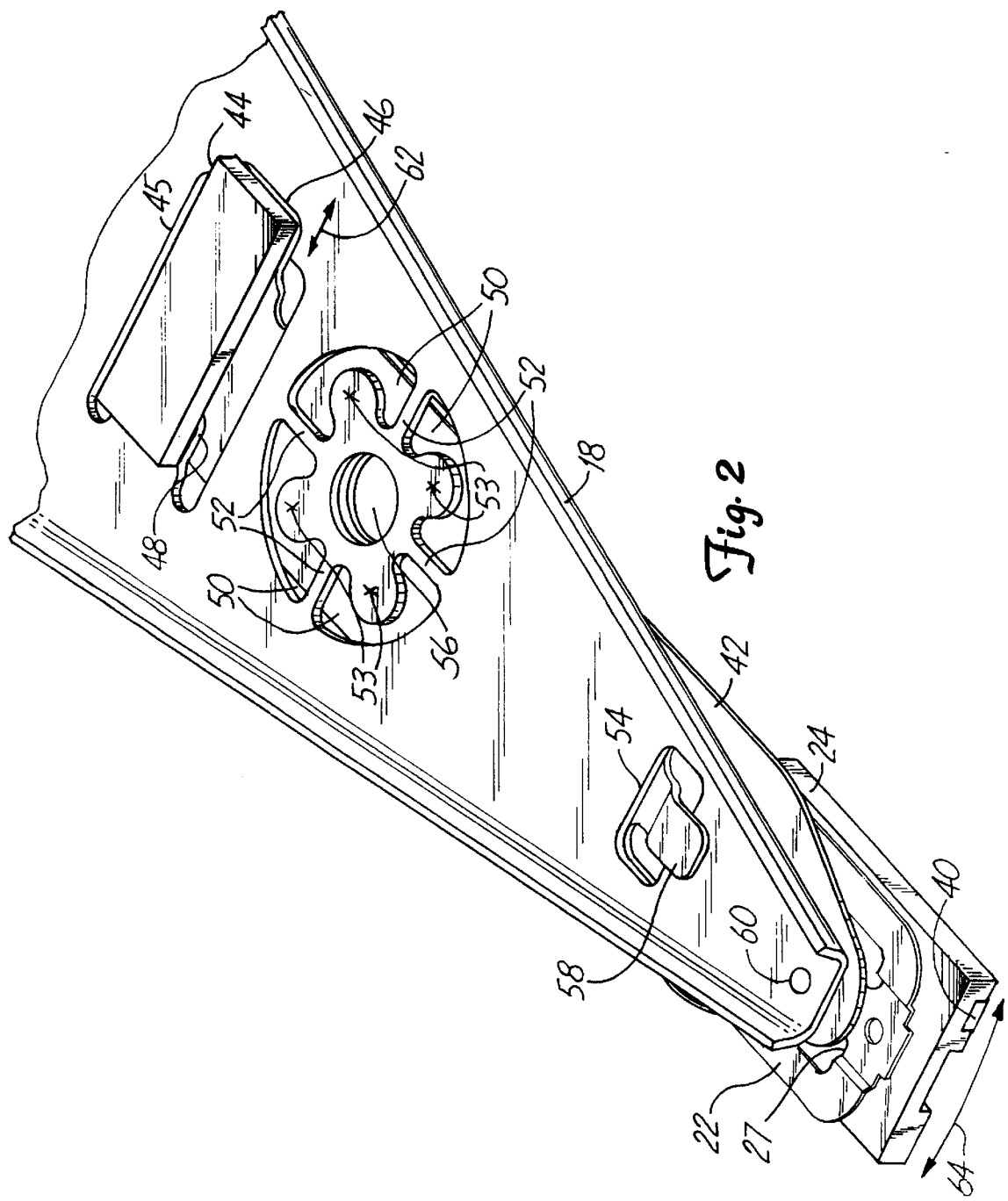
FIG. 2 is a perspective view of a portion of a disc drive system implementing a microactuator assembly at the interface between the load beam and the flexure according to a first embodiment of the present invention.
Figure 3:
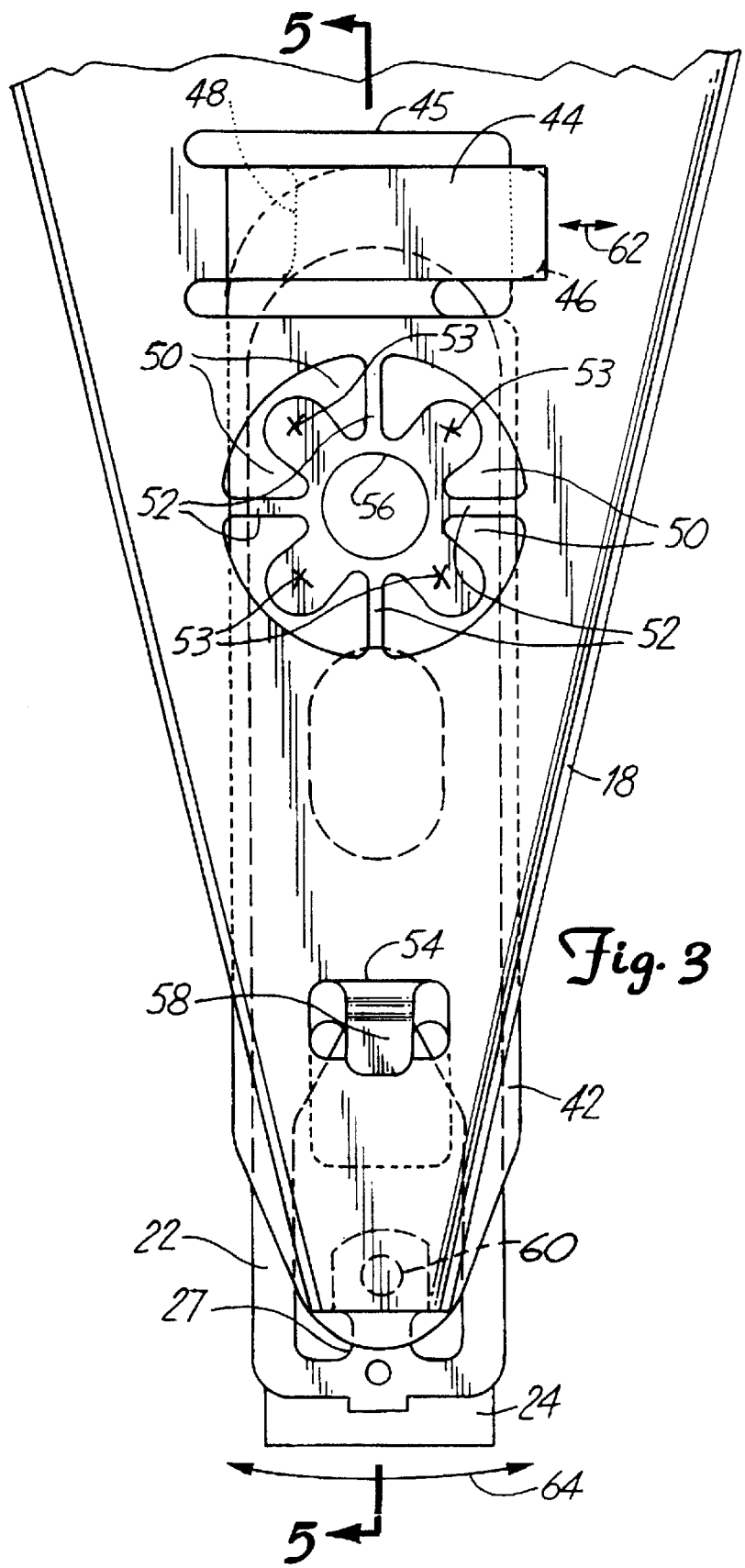
FIG. 3 is a top view of the microactuator assembly shown in FIG. 2.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks 34 of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 over a selected track 34 of disc 30. Therefore, a higher resolution actuation device is necessary.

FIGS. 2–5 illustrate a portion of disc drive system 10 implementing a microactuator assembly at the interface between load beam 18 and flexure 22 according to a first embodiment of the present invention. Lever plate 42 is operatively attached between load beam 18 and flexure 22 to effect high resolution positioning of head 40 on slider 24. Lever plate 42 includes tab 46 extending through aperture 45 and over the top surface of load beam 18. Tab 48 on load beam 18 provides a landing at the same general plane as the landing formed by tab 46. Piezoelectric element 44 is mounted to and connected between tab 46 and tab 48.

A plurality of apertures 50 are formed, such as by etching or punching, in load beam 18 to form hinges 52 in the structure of load beam 18. Lever plate 42 is attached to load beam 18 proximate to hinges 52 by welded joints 53. Aperture 56 extends through load beam 18, lever plate 42 and flexure 22, and permits registration of the actuator assembly. Flexure 22 is rigidly attached to lever plate 42 along the length of the plate 42.

Tab 58 is optionally provided on lever plate 42, protruding through aperture 54 in load beam 18, and includes a dampening material beneath it to reduce the effects of vibrations on the microactuator assembly, both vertically and in the plane of slider actuation. Tongue 27 of flexure 22 is attached to slider 24, supporting the slider and permitting flexibility of elevation of the slider. Load beam 18 applies a load to slider 24 through lever plate 42 and tongue 27 of flexure 22 at load point 60, ensuring that head 40 is maintained in close proximity with the surface of disc 30.

In operation, after coarse positioning has been accomplished by VCM 12 (FIG. 1), a voltage is applied to piezoelectric element 44 by two leads (not shown) to selectively cause expansion or contraction of the element. Tab 48 of load beam 18 is effectively a fixed or restrained point, while tab 46 of lever plate 42 is effectively a movable or unrestrained point, so that expansion and contraction of piezoelectric element 44 results in movement of tab 46 in the direction indicated by arrows 62. This linear movement of tab 46 of lever plate 42 is translated into arcuate rotational motion by the arrangement of hinges 52 of load beam 18. A linear force on tab 46 in the direction of arrows 62 forces hinges 52 to distort and bend, because of the connection between lever plate 42 and load beam 18 at aperture 56. The distortion of hinges 52 causes lever plate 42 and flexure 22 to rotate on the axis of aperture 56, resulting in arcuate displacement of transducing head 40 at the trailing edge of slider 24 in the direction indicated by arrows 64, in the general plane of load beam 18. The motion of head 40 is extremely small and precisely controllable by the expansion and contraction of piezoelectric element 44, thereby allowing head 40 to be finely positioned over a selected radial track of a rotating disc.

Figure 6:
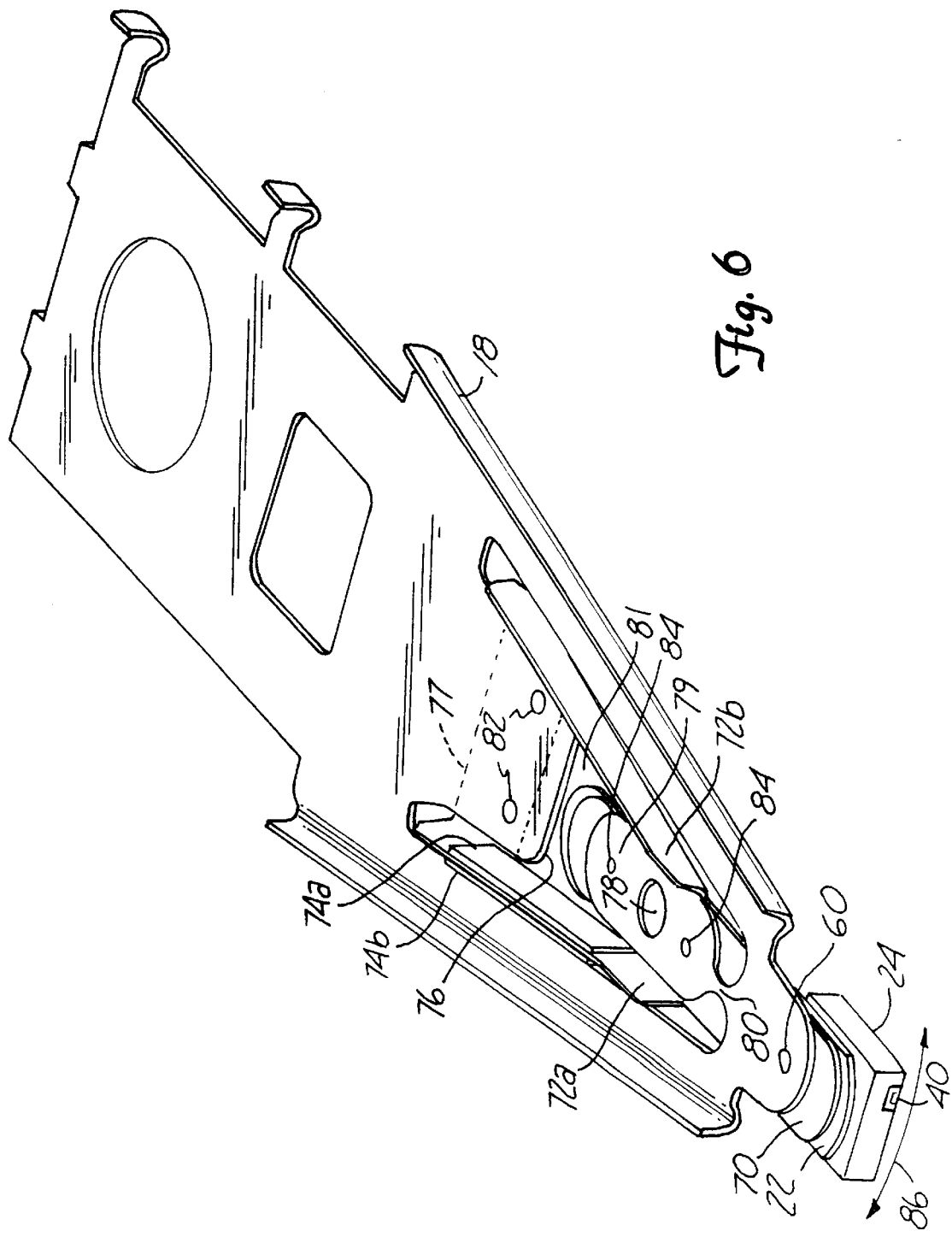
FIG. 6 is a perspective view of a portion of a disc drive system implementing a microactuator assembly at the interface between the load beam and the flexure according to a second embodiment of the present invention.
Figure 7:
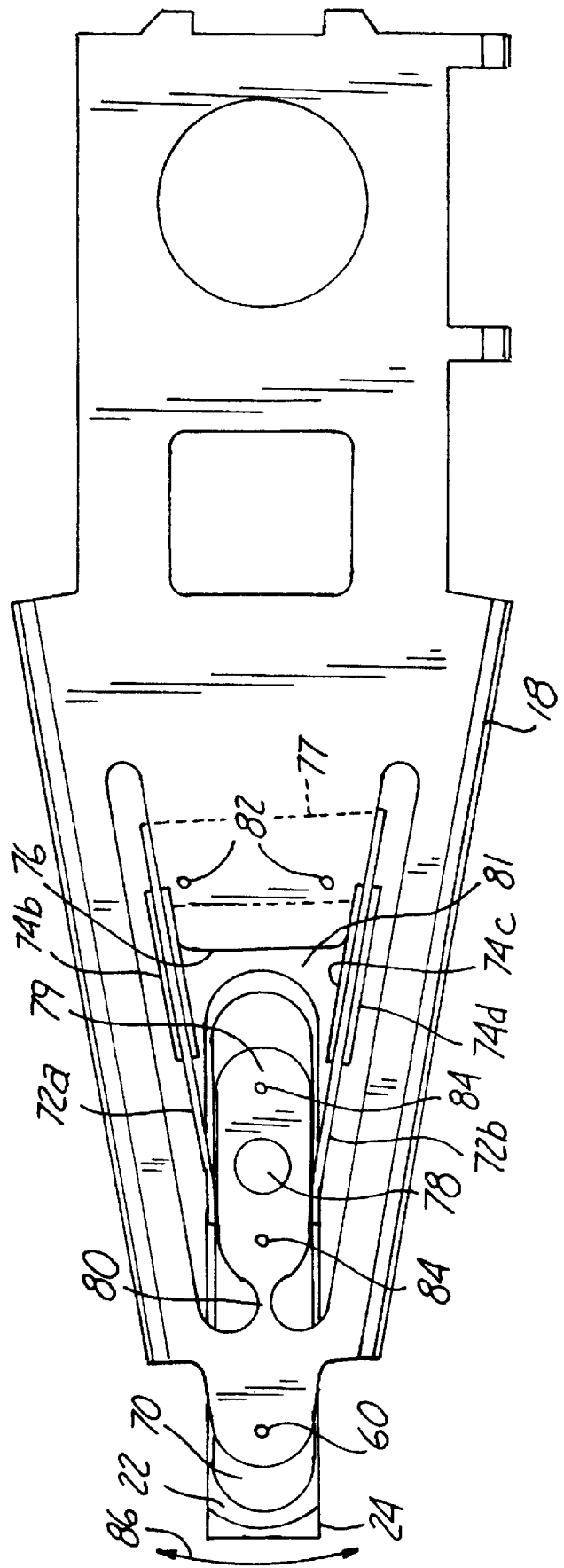
FIG. 7 is a top view of the microactuator assembly shown in FIG. 6.

FIG. 6 is a perspective view, and FIG. 7 is a top view of a portion of disc drive system 10 implementing a microactuator assembly at the interface between load beam 18 and flexure 22 according to a second embodiment of the present invention. Lever plate 70 is attached to load beam 18 and flexure 22 to effect high resolution positioning of head 40 on slider 24. Lever plate 70 includes bent flaps 72a and 72b extending perpendicular to the general plane of load beam 18. Piezoelectric element 74a is mounted to flap 72a, forming a unimorph bending motor, the operation of which is discussed below with respect to FIGS. 14 and 15. In an optional embodiment, piezoelectric element 74b is mounted to flap 72a opposite piezoelectric element 74a to form a second complementary unimorph bending motor, the operation of which is discussed below with respect to FIGS. 16 and 17. In another optional embodiment, piezoelectric elements 74c and 74d are mounted to opposite sides of flap 72b, thereby forming two pairs of complementary unimorph bending motors on both flaps 72a and 72b. Piezoelectric elements 74a, 74b, 74c and 74d are preferably formed and terminated prior to attachment to flaps 72a and 72b, and are preferably insulated from flaps 72a and 72b by an insulating adhesive, for example.

Aperture 81 is formed in load beam 18 to leave an extension tab portion 79 connected to a distal end of load beam 18 by narrow hinge 80. Aperture 78 is formed through extension tab portion 79 of load beam 18, lever plate 70 and flexure 22 to permit registration of the actuator assembly. Tab 76 on load beam 18 provides a landing on a plane parallel to the plane of load beam 18. Cross beam 77 of lever plate 70 is rigidly attached to tab 76 at welded joints 82, and lever plate 70 is also rigidly attached to extension tab portion 79 of load beam 18 at welded joints 84. Flexure 22 is rigidly attached to lever plate 70 along the length of the plate 70. Flexure 22 may include a tongue, like tongue 27 in the embodiment shown in FIGS. 2–5, attached to slider 24 to support the slider and permit flexibility of elevation of the slider. Load beam 18 applies a load to slider 24 through lever plate 70 and flexure 22 at load point 60, ensuring that head 40 is maintained in close proximity with the surface of disc 30.

In operation, after coarse positioning has been accomplished by VCM 12 (FIG. 1), a voltage is applied across piezoelectric element 74a to selectively cause expansion or contraction of the element. Tab 76 of load beam 18 is effectively a fixed or restrained point while extended tab portion 79 of load beam 18 is effectively a movable or unrestrained point due to the hinging effect of hinge 80, so that expansion and contraction of piezoelectric element 74a to apply force to flap 72a results in bending of hinge 80. The distortion of hinge 80 causes lever plate 70 and flexure 22 to rotate on an axis at hinge 80, resulting in arcuate displacement of transducing head 40 at the trailing edge of slider 24 in the direction indicated by arrows 86, in the general plane of load beam 18. The motion of head 40 is extremely small and precisely controllable by the expansion and contraction of piezoelectric element 74a and the resulting bending of hinge 80, thereby allowing head 40 to be finely positioned over a selected radial track of a rotating disc. The detailed operation of piezoelectric element 74a (for a single unimorph configuration) and of piezoelectric elements 74a and 74b, and 74c and 74d (for a complementary dual unimorph configuration) is discussed below with respect to FIGS. 14 and 15 and FIGS. 16 and 17, respectively.

Figure 8:
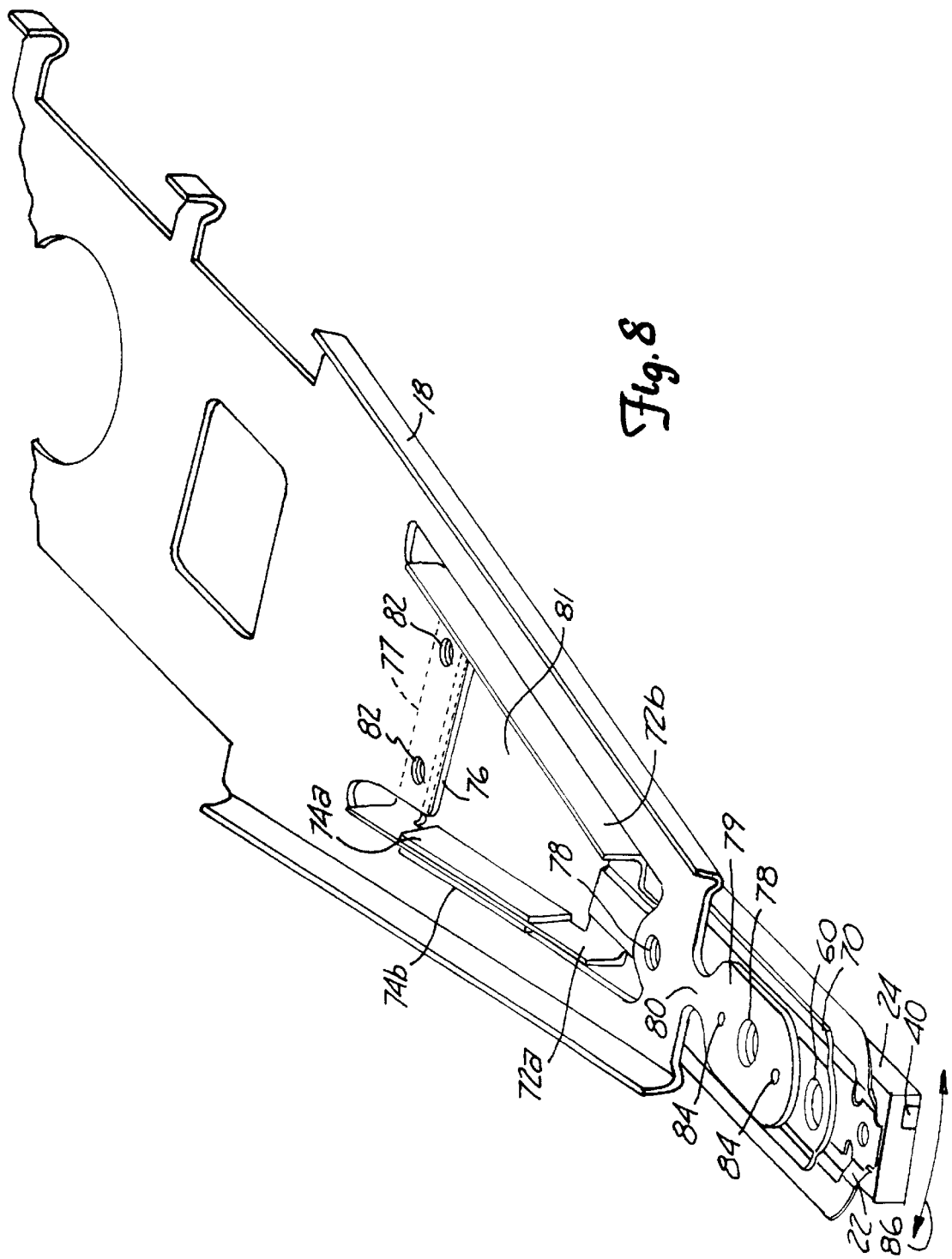
FIG. 8 is a perspective view of a portion of a disc drive system implementing a microactuator assembly at the interface between the load beam and the flexure according to a third embodiment of the present invention.
Figure 9:
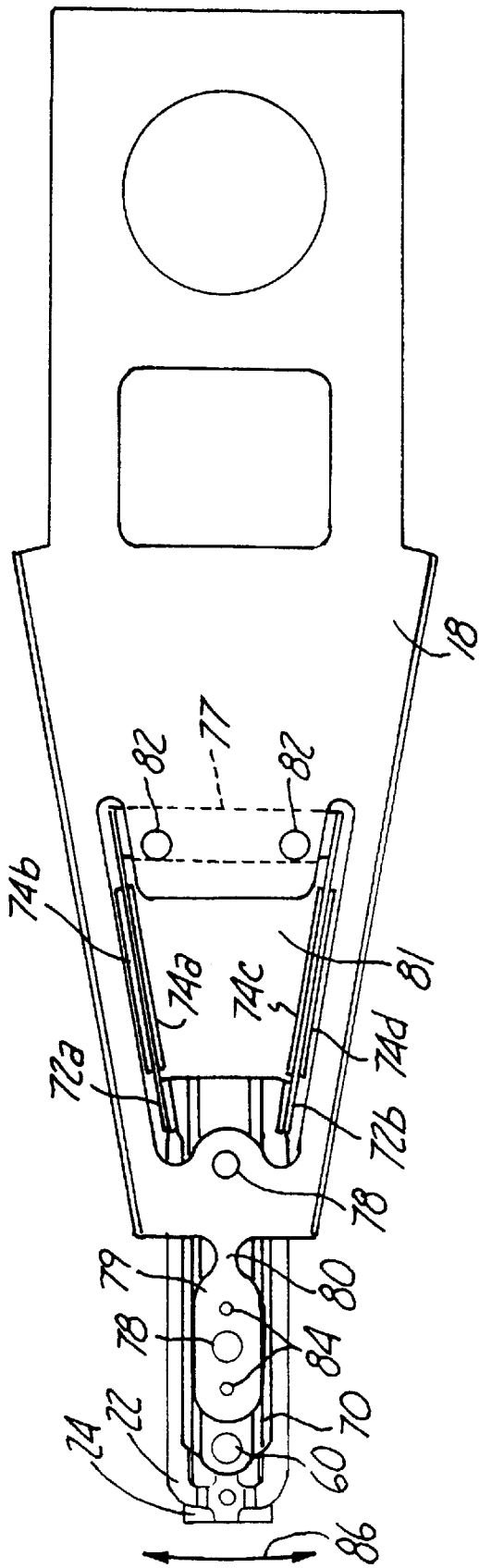
FIG. 9 is a top view of the microactuator assembly shown in FIG. 8.

FIG. 8 is a perspective view, and FIG. 9 is a top view of a portion of disc drive system 10 implementing a microactuator assembly at the interface between load beam 18 and flexure 22 according to a third embodiment of the present invention. Lever plate 70 is attached to load beam 18 and flexure 22 to effect high resolution positioning of head 40 on slider 24. Lever plate 70 includes bent flaps 72a and 72b extending perpendicular to the general plane of load beam 18. Piezoelectric element 74a is mounted to flap 72a, forming a unimorph bending motor, the operation of which is discussed below with respect to FIGS. 14 and 15. In an optional embodiment, piezoelectric element 74b is mounted to flap 72a opposite piezoelectric element 74a to form a second complementary unimorph bending motor, the operation of which is discussed below with respect to FIGS. 16 and 17. In another optional embodiment, piezoelectric elements 74c and 74d are mounted to opposite sides of flap 72b, thereby forming two pairs of complementary unimorph bending motors on both flaps 72a and 72b. Piezoelectric elements 74a, 74b, 74c and 74d are preferably formed and terminated prior to attachment to flaps 72a and 72b, and are preferably insulated from flaps 72a and 72b by an insulating adhesive, for example.

Load beam 18 includes an aperture 81 and an extension tab portion 79 connected to a distal end of load beam 18 by narrow hinge 80 and extending distally away from load beam 18. Apertures 78 are formed through load beam 18 at the distal end and through extension tab portion 79 of load beam 18, through lever plate 70 and through flexure 22 to permit registration of the actuator assembly. Tab 76 on load beam 18 provides a landing on a plane parallel to the plane of load beam 18. Cross beam 77 of lever plate 70 is rigidly attached to tab 76 at welded joints 82, and lever plate 70 is also rigidly attached to extension tab portion 79 of load beam 18 at welded joints 84. Flexure 22 is rigidly attached to lever plate 70 along the length of the plate 70. Flexure 22 may include a tongue, like tongue 27 in the embodiment shown in FIGS. 2–5, attached to slider 24 to support the slider and permit flexibility of elevation of the slider. Load beam 18 applies a load to slider 24 through lever plate 70 at load point 60, ensuring that head 40 is maintained in close proximity with the surface of disc 30.

In operation, after coarse positioning has been accomplished by VCM 12 (FIG. 1), a voltage is applied across piezoelectric element 74a to selectively cause expansion or contraction of the element. Tab 76 of load beam 18 is effectively a fixed or restrained point, while extended tab portion 79 of load beam 18 is effectively a movable or unrestrained point due to the hinging effect of hinge 80, so that expansion and contraction of piezoelectric element 74a to apply force to flap 72a results in bending of hinge 80. The distortion of hinge 80 causes lever plate 70 and flexure 22 to rotate on an axis at hinge 80, resulting in arcuate displacement of transducing head 40 at the trailing edge of slider 24 in the direction indicated by arrows 86, in the general plane of load beam 18. The motion of head 40 is extremely small and precisely controllable by the expansion and contraction of piezoelectric element 74a and the resulting bending of hinge 80, thereby allowing head 40 to be finely positioned over a selected radial track of the rotating disc. The detailed operation of piezoelectric element ensuring that head 40 is maintained in close proximity with the surface of disc 30.

In operation, after coarse positioning has been accomplished by VCM 12 (FIG. 1). A voltage is applied across piezoelectric element 74a to selectively cause expansion or contraction of the element. Tab 77 attached to load beam 18 is effectively a fixed or restrained point, while extended tab portion 79 of load beam 18 is effectively a movable or unrestrained point due to the hinging effect of hinge 80, so that expansion and contraction of piezoelectric element 74a to apply force to flap 72 results in bending of hinge 80. The distortion 80 causes lever plate 70 and flexure 22 to rotate on an axis at hinge 80, resulting in arcuate displacement of transducing head 40 at the trailing edge of slider 24 in the direction indicated by arrows 86, in the general plane of load beam 18. The motion of head 40 is extremely small and precisely controllable by the expansion and contraction of piezoelectric element 74a and the resulting bending of hinge 80, thereby allowing head 40 to be finely positioned over a selected radial track of the rotating disc. The detailed operation of piezoelectric element 74a (for a single unimorph configuration) and of piezoelectric elements 74a and 74b (for a complementary dual unimorph configuration) is discussed below with respect to FIGS. 14 and 15 and FIGS. 16 and 17, respectively.

Figure 12:
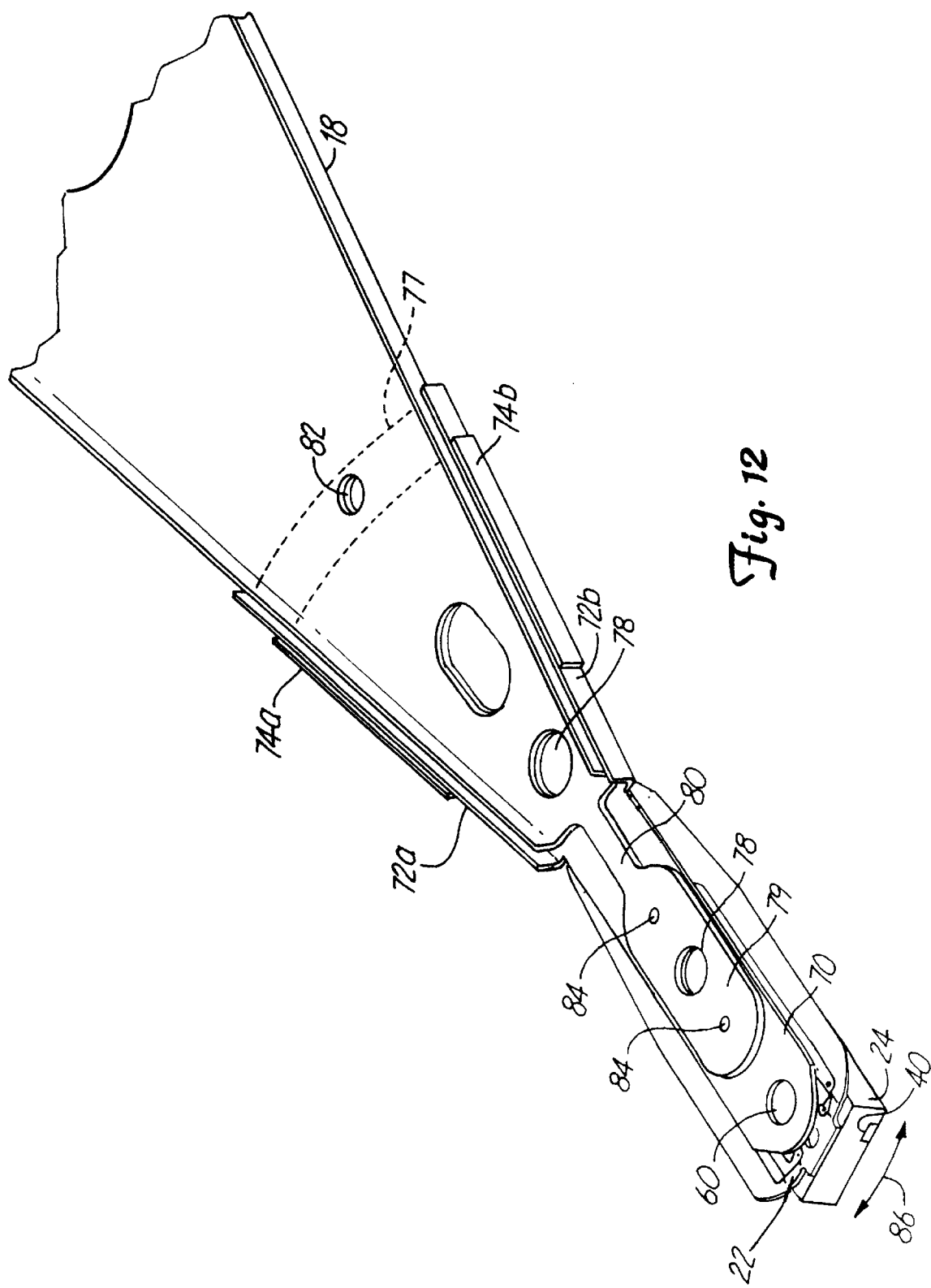
FIG. 12 is a perspective view of a portion of a disc drive system implementing a microactuator assembly at the interface between the load beam and the flexure according to a fifth embodiment of the present invention.
Figure 13:
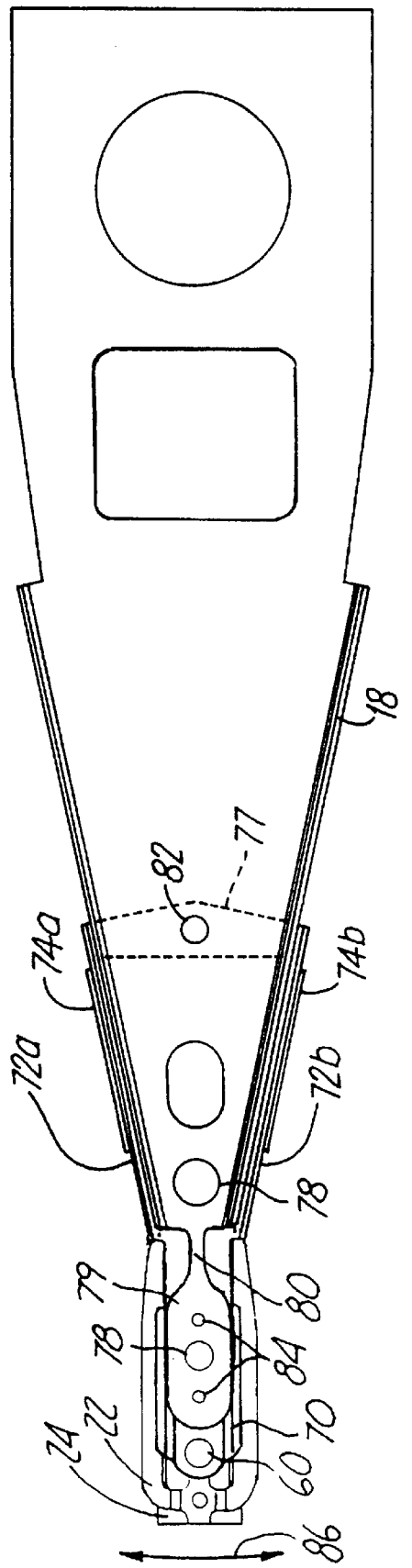
FIG. 13 is a top view of the microactuator assembly shown in FIG. 12.

FIG. 12 is a perspective view, and FIG. 13 is a top view of a portion of disc drive system 10 implementing a microactuator assembly at the interface between load beam 18 and flexure 22 according to a fifth embodiment of the present invention. Lever plate 70 is attached to load beam 18 and flexure 22 to effect high resolution positioning of head 40 on slider 24. Lever plate 70 includes bent flaps 72a and 72b extending perpendicular to the general plane of load beam 18. Piezoelectric element 74a is mounted to flap 72a, forming a unimorph bending motor, the operation of which is discussed below with respect to FIGS. 14 and 15. In an optional embodiment, piezoelectric element 74b is mounted to flap 72b, thereby forming two pairs of unimorph bending motors on both flaps 72a and 72b. In another optional embodiment, which is not shown pictorially in FIGS. 12 and 13 for clarity, additional piezoelectric elements may 74a (for a single unimorph configuration) and of piezoelectric elements 74a and 74b, and 74c and 74d (for a complementary dual unimorph configuration) is discussed below with respect to FIGS. 14 and 15 and FIGS. 16 and 17, respectively.

Figure 10:
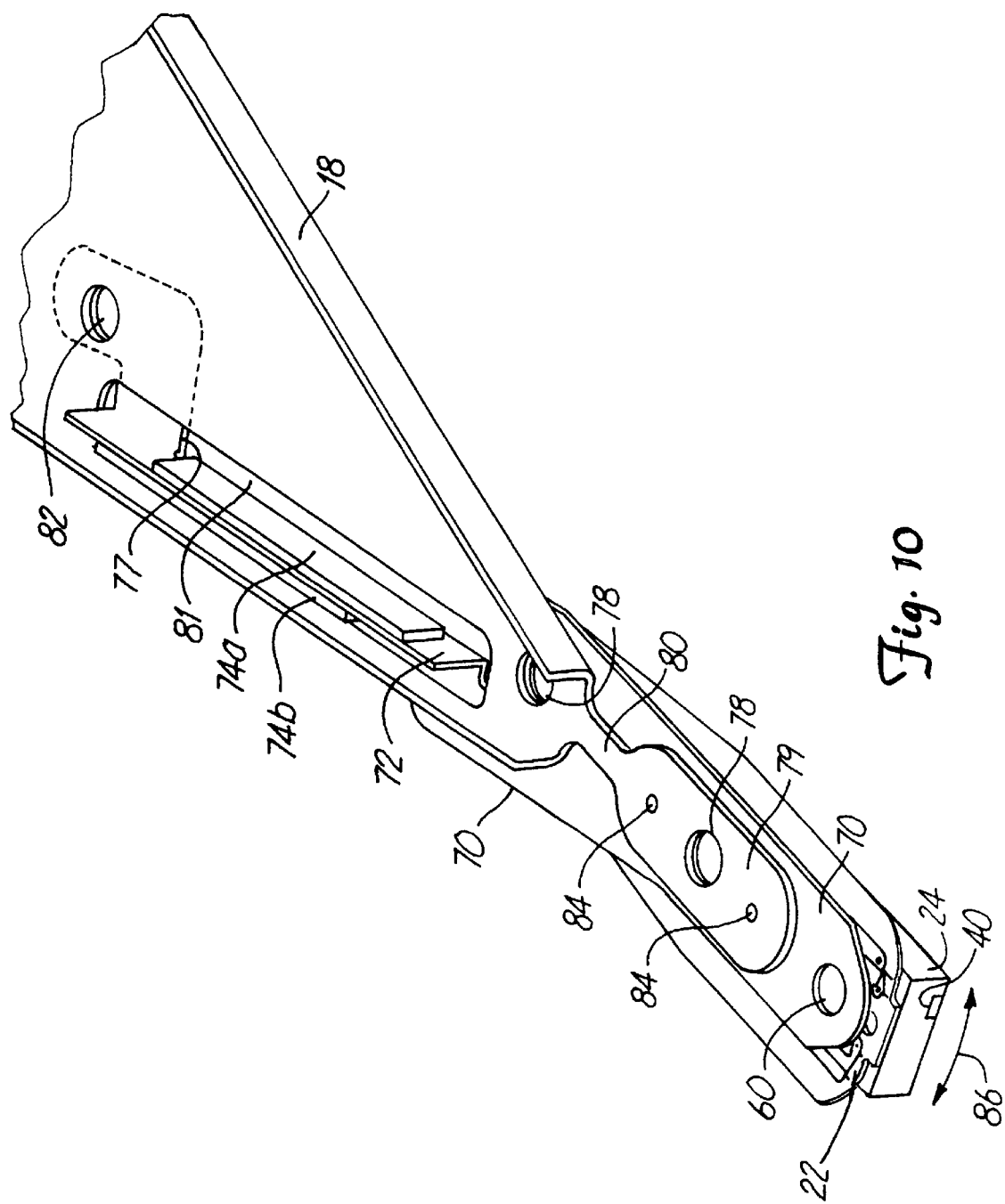
FIG. 10 is a perspective view of a portion of a disc drive system implementing a microactuator assembly at the interface between the load beam and the flexure according to a fourth embodiment of the present invention.
Figure 11:
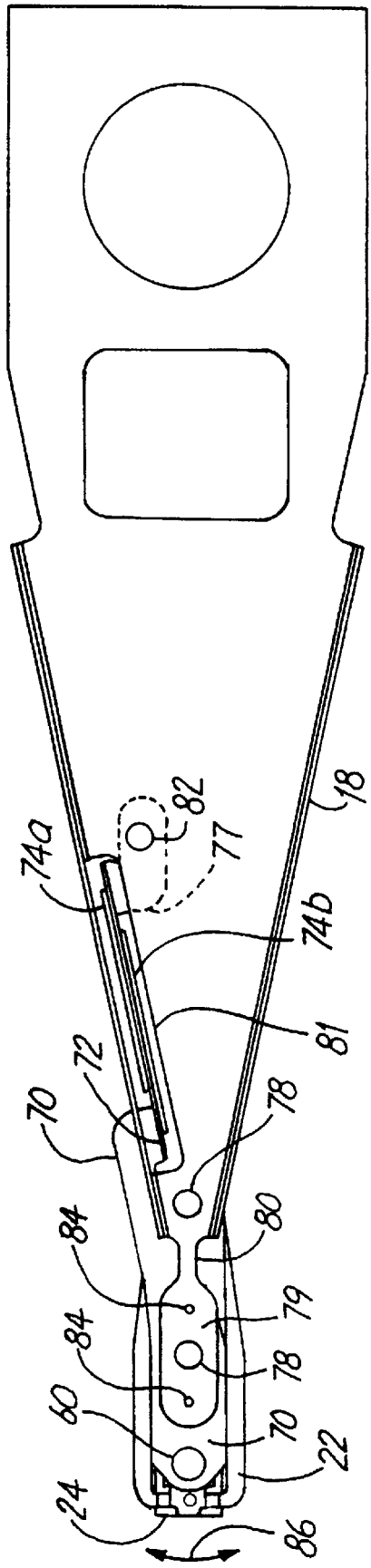
FIG. 11 is a top view of the microactuator assembly shown in FIG. 10.

FIG. 10 is a perspective view, and FIG. 11 is a top view of a portion of disc drive system 10 implementing a microactuator assembly at the interface between load beam 18 and flexure 22 according to a fourth embodiment of the present invention. Lever plate 70 is attached to load beam 18 and flexure 22 to effect high resolution positioning of head 40 on slider 24. Lever plate 70 includes bent flap 72 extending perpendicular to the general plane of load beam 18. Piezoelectric element 74a is mounted to flap 72, forming a unimorph bending motor, the operation of which is discussed below with respect to FIGS. 14 and 15. In an optional embodiment, piezoelectric element 74b is mounted to flap 72 opposite piezoelectric element 74a to form a second complementary unimorph bending motor, the operation of which is discussed below with respect to FIGS. 16 and 17. Piezoelectric elements 74a and 74b are preferably formed and terminated prior to attachment to flap 72, and are preferably insulated from flap 72 by an insulating adhesive, for example.

Load beam 18 includes an aperture 81 and an extension tab portion 79 connected to a distal end of load beam 18 by narrow hinge 80 and extending distally away from load beam 18. Apertures 78 are formed through load beam 18 at the distal end and through extension tab portion 79 of load beam 18, through lever plate 70 and through flexure 22 to permit registration of the actuator assembly. Tab 77 of lever plate 70 is rigidly attached to load beam 18 at welded joint 82, and lever plate 70 is also rigidly attached to extension tab portion 79 of load beam 18 at welded joints 84. Flexure 22 is rigidly attached to lever plate 70 along the length of the plate 70. Flexure 22 may include a tongue, like tongue 27 in the embodiment shown in FIGS. 2–5, attached to slider 24 to support the slider and permit flexibility of elevation of the slider. Load beam 18 applies a load to slider 24 through lever plate 70 at load point 60, be mounted to flaps 72a and 72b opposite piezoelectric elements 74a and 74b to form complementary unimorph bending motors, the operation of which is discussed below with respect to FIGS. 16 and 17. Piezoelectric elements 74a and 74b are preferably formed and terminated prior to attachment to flaps 72a and 72b, and are preferably insulated from flaps 72a and 72b by an insulating adhesive, for example.

Load beam 18 includes an extension tab portion 79 connected to a distal end of load beam 18 by narrow hinge 80 and extending distally away from load beam 18. Apertures 78 are formed through load beam 18 at the distal end and through extension tab portion 79 of load beam 18, through lever plate 70 and through flexure 22 to permit registration of the actuator assembly. Cross beam 77 of lever plate 70 is rigidly attached to load beam 18 at welded joint 82, and lever plate 70 is also rigidly attached to extension tab portion 79 of load beam 18 at welded joints 84. Flexure 22 is rigidly attached to lever plate 70 along the length of the plate 70. Flexure 22 may include a tongue, like tongue 27 in the embodiment shown in FIGS. 2–5, attached to slider 24 to support the slider and permit flexibility of elevation of the slider. Load beam 18 applies a load to slider 24 through lever plate 70 at load point 60, ensuring that head 40 is maintained in close proximity with the surface of disc 30. The configuration of lever plate 70 shown in FIGS. 12 and 13, with bent flaps 72a and 72b extending along the outside of load beam 18, allows a standard load beam 18 to be used, including its associated registration apertures, simplifying the process required to implement the microactuator.

In operation, after coarse positioning has been accomplished by VCM 12 (FIG. 1), a voltage is applied across piezoelectric element 74a to selectively cause expansion or contraction of the element. Cross beam 77 attached to load beam 18 is effectively a fixed or restrained point, while extended tab portion 79 of load beam 18 is effectively a movable or unrestrained point due to the hinging effect of hinge 80, so that expansion and contraction of piezoelectric element 74a to apply force to flap 72a results in bending of hinge 80. The distortion of hinge 80 causes lever plate 70 and flexure 22 to rotate on to opposite sides of plate 112 by respective insulating adhesives 113a and 113b, for example, between respective conductive plates 115a and 115b and plate 112. Plate 112 is restrained at a proximal end by restraining clamp 118. Piezoelectric elements 114a and 114b are poled in opposite directions, as indicated by arrows 116a and 116b. Terminal 120 connects the surface of piezoelectric element 114a opposite plate 112, and also conductive plate 115b (contacting the surface of piezoelectric element 114b nearest plate 112) to a high potential. Terminal 122 connects the surface of piezoelectric element 114b opposite plate 112, and also conductive plate 115a (contacting the surface of piezoelectric element 114a nearest plate 112) to a lower potential.

Figure 17:
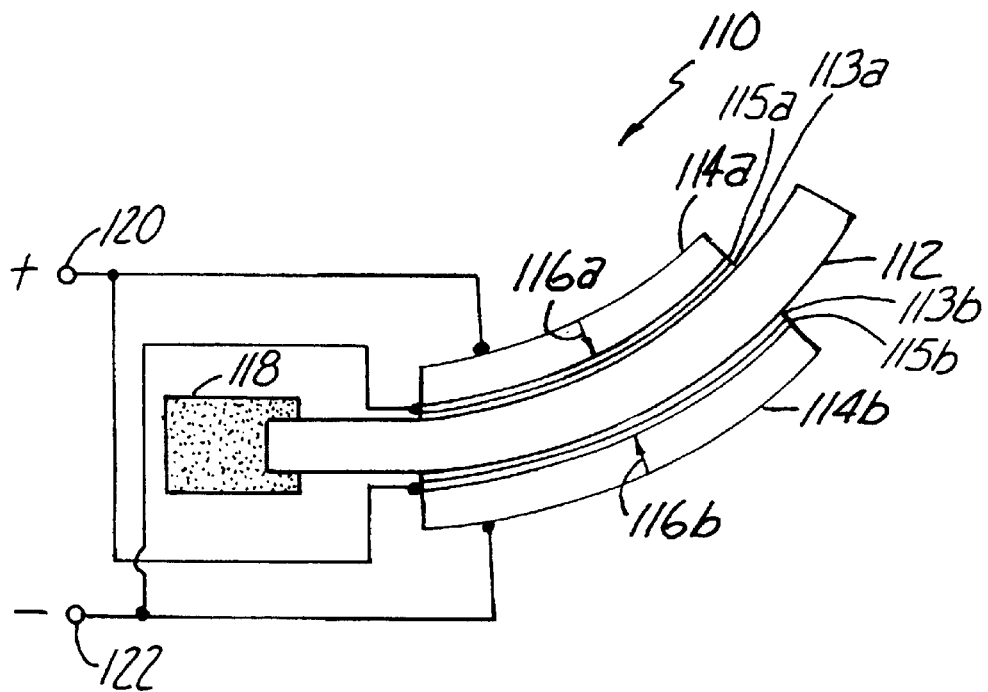
FIG. 17 is a diagram of the two complementary unimorph bending motors of FIG. 16 in their actuated positions.

In operation, when the potential difference between terminals 120 and 122 is applied across piezoelectric elements 114a and 114b, element 114a contracts along its length and element 114b expands along its length, forcing bending of the entire apparatus as indicated in FIG. 17. In this way, deflection at the distal tip of plate 112 may be achieved. Conversely, application of an opposite potential difference between terminals 120 and 122 across piezoelectric elements 114a and 114b results in opposite bending and opposite deflection at the distal tip of plate 92.

The implementation of lever plates 42 and 70 to radially move along with flexure 22 has several advantages. The movement of plates 42 and 70 and flexure 22 with respect to load beam 18 causes wear on the interface between load beam 18 and the moving part around load point 60. Employing plates 42 and 70 between load beam 18 and flexure 22 spreads the load forces and absorbs the wear that would otherwise occur on flexure 22 and potentially generate contamination and result in undesirable operating characteristics. Additionally, by designing plates 42 and 70 as separate parts to act as a lever for translating motion of piezoelectric elements 44 and 74a into rotational motion of head 40, a conventional flexure may be used, which is desirable because of the relatively high precision required and already in place in flexure design.

Many proposed microactuator designs use cantilevered components with micro-springs and air gaps, which are typically very sensitive an axis at hinge 80, resulting in arcuate displacement of transducing head 40 at the trailing edge of slider 24 in the direction indicated by arrows 86, in the general plane of load beam 18. The motion of head 40 is extremely small and precisely controllable by the expansion and contraction of piezoelectric element 74a and the resulting bending of hinge 80, thereby allowing head 40 to be finely positioned over a selected radial track of the rotating disc. The detailed operation of piezoelectric element 74a (for a single unimorph configuration) and of piezoelectric element 74b (for a second single unimorph configuration), is discussed below with respect to FIGS. 14 and 15.

Figure 14:
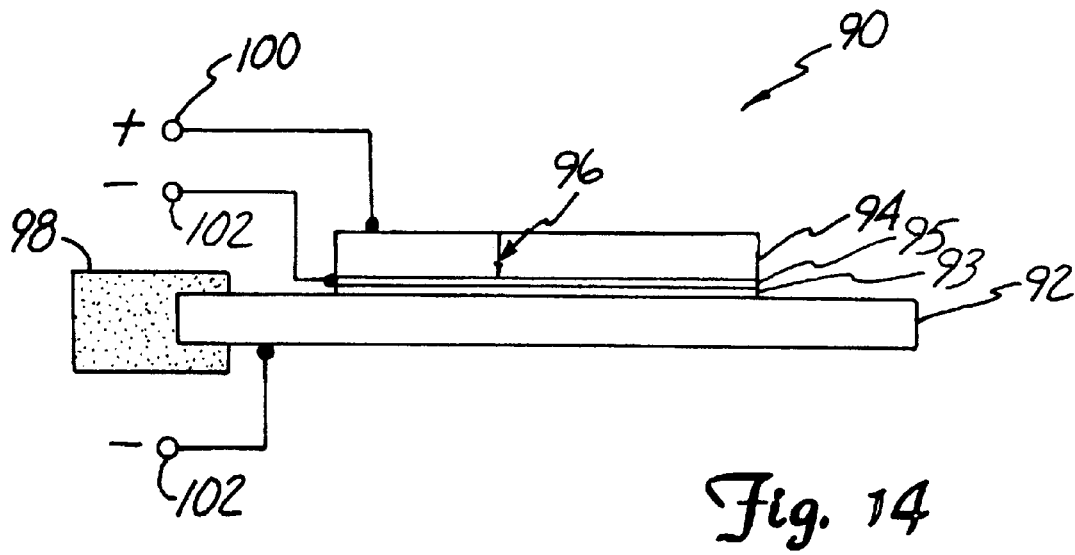
FIG. 14 is a diagram of a unimorph bending motor for use with the microactuator assembly of the present invention.
Figure 15:
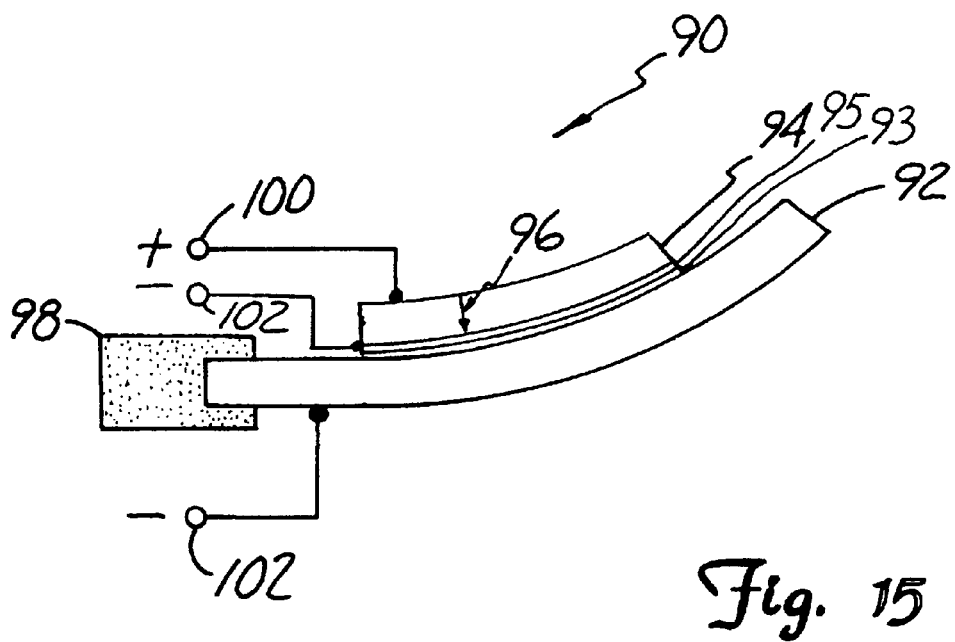
FIG. 15 is a diagram of the unimorph bending motor of FIG. 14 in its actuated position.

FIG. 14 is a diagram of a unimorph bending motor 90 in its neutral position, and FIG. 15 is a diagram of unimorph bending motor 90 in its actuated position. Piezoelectric element 94 has a conductive plate 95 forming a contact to its bottom surface, and is attached to plate 92 by an insulating adhesive 93, for example, between conductive plate 95 and plate 92. Plate 92 is restrained at a proximal end by restraining clamp 98. Piezoelectric element 94 is poled in the direction indicated by arrow 96. Terminal 100 connects the surface of piezoelectric element 94 most distant from plate 92 to a high potential, while terminal 102 connects conductive plate 95 (contacting the surface of piezoelectric element 94 nearest plate 92) to a lower potential.

In operation, when the potential difference between terminals 100 and 102 is applied across piezoelectric element 94, the element contracts along its length, forcing bending of piezoelectric element 94 and plate 92 as indicated in FIG. 15. In this way, a deflection at the distal tip of plate 92 may be achieved. Conversely, application of an opposite potential difference between terminals 100 and 102 across piezoelectric element 94 results in opposite bending and opposite deflection at the distal tip of plate 92.

Figure 16:
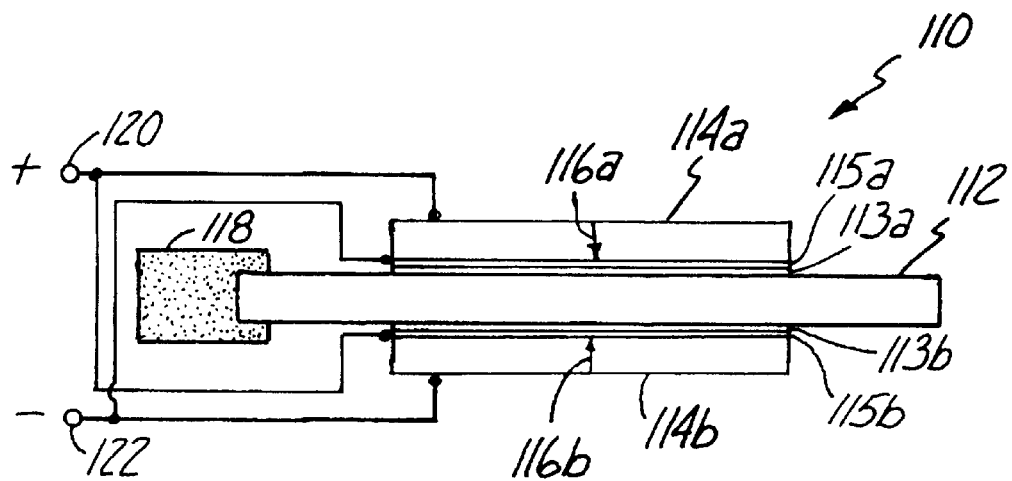
FIG. 16 is a diagram of two complementary unimorph bending motors for use with the microactuator assembly of the present invention.

FIG. 16 is a diagram of complementary dual unimorph bending motors 110 in their neutral position, and FIG. 17 is a diagram of the complementary dual unimorph bending motors 110 in their actuated position. Piezoelectric elements 114a and 114b have respective conductive plates 115a and 115b forming contacts to their surfaces nearest plate 112, and are attached to shock, vibrations, and even complications in the primary actuation process. The flexural pivot of the microactuator of the present invention is realized in the structure of load beam 18, between the piezoelectric element and slider 24. This configuration insulates the microactuator from shock and vibrations, by locating the pivot near the center of mass of the microactuating structure, and also allows the pivot to be designed with more stiffness than other microactuator designs, further reducing susceptibility to shock and vibration and improving the frequency (speed) of response of the microactuator.

The microactuator assembly is preferably located to minimize the effects of noise and interference from other resonant structures in the disc drive. Implementing the piezoelectric element of the microactuator at the interface between load beam 18 and flexure 22 is effective due to its relatively close proximity to transducing head 40 itself, which is designed in the disc drive to be kept free of interfering noise effects. Realizing the pivot at a point distant from slider 24 allows the motion of the piezoelectric element to be amplified into a greater motion by head 40; for example, a motion of piezoelectric element 44 of about 0.1% of its active length is able to alter the position of head 40 by approximately four data tracks (that is, plus or minus two tracks) for a track density of 15,000 tracks per inch. Similarly, where piezoelectric element 74a is 0.14 inch in length, the position of head 40 may be altered by approximately four data tracks (that is, plus or minus two tracks) for a track density of 15,000 tracks per inch.

The microactuator of the present invention may be constructed using conventional stainless steel sheet metal materials and the conventional processes of stamping, etching, bending and welding miniature components into a form suitable for disc drive components. These processes are well known in the art, and present minimal additional manufacturing difficulty and expense to one skilled in the art. The piezoelectric elements are also simple to manufacture. The present invention therefore provides effective head micropositioning capability with minimal additional complexity and expense compared to conventional designs, as low as 35 cents additional cost per unit.

Although the present invention has been described with reference to preferred embodiments, workers skilled in the art will recognize that changes may be made in form and detail without departing from the spirit and scope of the invention.

What is claimed is:

1. A disc drive having a mechanism for positioning a transducing head with respect to a selected radial track of a rotatable recording disc, the disc drive including:

an actuator arm;

a suspension load beam having a first portion rigidly attached to the actuator arm, a second portion, and a hinge between the first and second portions permitting radial movement of the second portion relative to the first portion;

a plate rigidly attached to the second portion of the load beam;

a flexure attached to the plate;

slider attached to the flexure and supporting the transducing head; and a microactuator attached to the plate and operable in response to electrical control signals to move the plate relative to the load beam in the general plane of the load beam to selectively radially position the transducing head proximate to the selected track on the rotatable recording disc.

2. The mechanism of claim 1, wherein the plate includes a first tab extending out of the plane occupied by the plate and the load beam includes an aperture through which the first tab protrudes, wherein the load beam includes a second tab, and wherein the microactuator is attached between the first and second tabs.

3. The mechanism of claim 1, wherein the load beam includes a plurality of apertures and the hinge comprises a plurality of individual hinges formed by the apertures, the second portion of the load beam being centrally positioned within the apertures.

4. The mechanism of claim 3, wherein the microactuator is attached between the plate and the load beam.

5. The mechanism of claim 1, wherein the load beam includes an aperture and the second portion comprises a tab extending into the aperture, the hinge comprising a narrow portion between the first and second portions.

6. The mechanism of claim 5, wherein the plate is rigidly attached to the first portion of the load beam and microactuator is attached to the plate between the attachment points of the plate to the first and second portions of the load beam.

7. The mechanism of claim 1, wherein the load beam, plate and flexure include aligned apertures for position registration.

8. The mechanism of claim 1, wherein the plate includes a tab extending out of the plane occupied by the plate and the load beam includes an aperture through which the tab protrudes, and wherein a dampening material is disposed between the tab and the load beam to reduce vibration of the plate and flexure with respect to the load beam.

9. A disc drive having a mechanism for positioning a transducing head with respect to a selected radial track of a rotatable recording disc, the disc drive including:

an actuator arm;

a plate having a first tab; suspension load beam connected to the actuator arm, the load beam having a second tab and an aperture through which the first tab of the plate protrudes;

a flexure attached to the plate;

a slider attached to the flexure and supporting the transducing head;

means hingedly attaching the plate to the load beam; and a microactuator attached between the first tab of the plate and the second tab of the load beam and operable in response to electrical control signals to move the plate relative to the load beam in the general plane of the load beam to selectively radially position the transducing head proximate to the selected track on the rotatable recording disc.

* * * * *

UNITED STATES PATENT AND TRADEMARK OFFICE
CERTIFICATE OF CORRECTION

PATENT NO. : 6,222,706 B1
DATED : April 24, 2001
INVENTOR(S) : Frederick M. Stefansky et al.

It is certified that error appears in the above-identified patent and that said Letters Patent is hereby corrected as shown below:

Column 9,
Line 52, delete "slider", insert -- a slider --

Signed and Sealed this

Twenty-sixth Day of February, 2002

Attest:

Attesting Officer

JAMES E. ROGAN
Director of the United States Patent and Trademark Office